(12) United States Patent
Hong et al.

(10) Patent No.: US 6,341,125 B1
(45) Date of Patent: Jan. 22, 2002

(54) METHOD FOR IMPROVING TFCI TRANSPORTATION PERFORMANCE

(75) Inventors: Sung Kwon Hong, Kyonggi-do; Sung Lark Kwon, Seoul; Young Woo Yun, Seoul; Ki Jun Kim, Seoul, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/714,457

(22) Filed: Nov. 17, 2000

(30) Foreign Application Priority Data

Nov. 19, 1999 (KR) ................................ 99-51599

(51) Int. Cl.[7] .................... H04B 7/216; H04Q 7/20; G06F 11/00
(52) U.S. Cl. ................ 370/335; 375/265; 445/434; 445/450; 714/704; 704/244
(58) Field of Search .................. 370/320, 321, 370/326, 335, 342, 347, 350; 375/130, 140, 224, 225, 265, 340, 341, 349, 352; 455/63, 67.3, 69, 103, 427, 428, 450, 434; 714/704, 758, 796; 704/242, 243, 244

(56) References Cited

U.S. PATENT DOCUMENTS 5,555,257 A * 9/1996 Dent .......................... 455/428
5,812,947 A * 9/1998 Dent .......................... 455/427
6,128,276 A * 10/2000 Agee .......................... 370/335
6,208,699 B1 * 3/2001 Chen et al. .................. 375/140

OTHER PUBLICATIONS

Chouley et al. "Orthogonal multicarrier ..", IEEE, 1993 #0-7803-0917, pp. 1723-1728.*

* cited by examiner

Primary Examiner—Alpus H. Hsu
Assistant Examiner—Afsar M. Qureshi
(74) Attorney, Agent, or Firm—Fleshner & Kim, LLP (57) ABSTRACT

Method for improving a TFCI transportation performance, including the steps of (1) coding TFCI information bits to be transported through each radio frame, (2) repeating a TFCI code word produced by the coding for an arbitrary times, (3) applying puncturing patterns different from each other to the repeated code words produced as many as the repeated times, and puncturing the repeated code words at locations different from each other, and (4) dividing, inserting, and transporting the punctured fixed length repeated code words in each slot of the radio frame, whereby improving TFCI information transportation performance, and embodying the receiver side decoder to be identical to a case when a 32 bit code word are transported perfectly.

29 Claims, 12 Drawing Sheets

| Slot No | Bit of TFCI code word | | | | | | | |
|---|---|---|---|---|---|---|---|---|
| 0 | $b^1_{29}$ | $b^1_{28}$ | $b^1_{27}$ | $b^1_{26}$ | $b^1_{25}$ | $b^1_{24}$ | $b^1_{23}$ | $b^1_{22}$ |
| 1 | $b^1_{21}$ | $b^1_{20}$ | $b^1_{19}$ | $b^1_{18}$ | $b^1_{17}$ | $b^1_{16}$ | $b^1_{15}$ | $b^1_{14}$ |
| 2 | $b^1_{13}$ | $b^1_{12}$ | $b^1_{11}$ | $b^1_{10}$ | $b^1_{9}$ | $b^1_{8}$ | $b^1_{7}$ | $b^1_{6}$ |
| 3 | $b^1_{5}$ | $b^1_{4}$ | $b^1_{3}$ | $b^1_{2}$ | $b^1_{1}$ | $b^1_{0}$ | | |
| 4 | $b^2_{27}$ | $b^2_{28}$ | $b^2_{25}$ | $b^2_{26}$ | $b^2_{23}$ | $b^2_{24}$ | $b^2_{29}$ | $b^2_{28}$ |
| 5 | $b^2_{19}$ | $b^2_{18}$ | $b^2_{17}$ | $b^2_{18}$ | $b^2_{15}$ | $b^2_{16}$ | $b^2_{21}$ | $b^2_{20}$ |
| 6 | $b^2_{11}$ | $b^2_{10}$ | $b^2_{9}$ | $b^2_{8}$ | $b^2_{7}$ | $b^2_{6}$ | $b^2_{13}$ | $b^2_{12}$ |
| 7 | $b^2_{3}$ | $b^2_{2}$ | $b^2_{1}$ | $b^2_{0}$ | | | $b^2_{5}$ | $b^2_{4}$ |
| 8 | $b^3_{25}$ | $b^3_{22}$ | $b^3_{23}$ | $b^3_{22}$ | $b^3_{29}$ | $b^3_{28}$ | $b^3_{27}$ | $b^3_{28}$ |
| 9 | $b^3_{17}$ | $b^3_{14}$ | $b^3_{15}$ | $b^3_{14}$ | $b^3_{21}$ | $b^3_{20}$ | $b^3_{19}$ | $b^3_{18}$ |
| 10 | $b^3_{9}$ | $b^3_{6}$ | $b^3_{7}$ | $b^3_{6}$ | $b^3_{13}$ | $b^3_{12}$ | $b^3_{11}$ | $b^3_{10}$ |
| 11 | $b^3_{1}$ | $b^3_{0}$ | | | $b^3_{5}$ | $b^3_{4}$ | $b^3_{3}$ | $b^3_{2}$ |
| 12 | $b^4_{23}$ | $b^4_{22}$ | $b^4_{29}$ | $b^4_{27}$ | $b^4_{26}$ | $b^4_{25}$ | $b^4_{24}$ | |
| 13 | $b^4_{15}$ | $b^4_{14}$ | $b^4_{21}$ | $b^4_{19}$ | $b^4_{18}$ | $b^4_{17}$ | $b^4_{16}$ | |
| 14 | $b^4_{7}$ | $b^4_{6}$ | $b^4_{13}$ | $b^4_{11}$ | $b^4_{10}$ | $b^4_{9}$ | $b^4_{8}$ | |

| Slot No | Bit of TFCI code word | | | | | | | |
|---|---|---|---|---|---|---|---|---|
| 0 | $b^1_{31}$ | $b^1_{30}$ | $b^1_{29}$ | $b^1_{28}$ | $b^1_{27}$ | $b^1_{26}$ | $b^1_{25}$ | $b^1_{24}$ |
| 1 | $b^1_{23}$ | $b^1_{22}$ | $b^1_{21}$ | $b^1_{20}$ | $b^1_{19}$ | $b^1_{18}$ | $b^1_{17}$ | $b^1_{15}$ |
| 2 | $b^1_{14}$ | $b^1_{13}$ | $b^1_{12}$ | $b^1_{11}$ | $b^1_{10}$ | $b^1_9$ | $b^1_8$ | $b^1_7$ |
| 3 | $b^2_6$ | $b^1_5$ | $b^1_4$ | $b^1_3$ | $b^1_2$ | $b^1_1$ | | |
| 4 | $b^2_{29}$ | $b^2_{28}$ | $b^2_{27}$ | $b^2_{26}$ | $b^2_{25}$ | $b^2_{24}$ | | $b^2_{30}$ |
| 5 | $b^2_{21}$ | $b^2_{19}$ | $b^2_{18}$ | $b^2_{20}$ | $b^2_{16}$ | $b^2_{15}$ | $b^2_{17}$ | $b^2_{22}$ |
| 6 | $b^2_{12}$ | $b^2_{11}$ | $b^2_{10}$ | $b^2_9$ | $b^2_8$ | $b^2_7$ | $b^2_{14}$ | $b^2_{13}$ |
| 7 | $b^2_3$ | $b^2_2$ | $b^2_1$ | $b^2_0$ | | | $b^2_6$ | $b^2_5$ |
| 8 | $b^3_{27}$ | $b^3_{26}$ | $b^3_{25}$ | $b^3_{23}$ | $b^3_{31}$ | $b^3_{30}$ | $b^3_{29}$ | $b^3_{28}$ |
| 9 | $b^3_{18}$ | $b^3_{17}$ | $b^3_{16}$ | $b^3_{15}$ | $b^3_{22}$ | $b^3_{21}$ | $b^3_{20}$ | $b^3_{19}$ |
| 10 | $b^3_{10}$ | $b^3_9$ | $b^3_7$ | $b^3_6$ | $b^3_{14}$ | $b^3_{13}$ | $b^3_{12}$ | $b^3_{11}$ |
| 11 | $b^3_1$ | $b^3_0$ | | | $b^3_5$ | $b^3_4$ | $b^3_3$ | $b^3_2$ |
| 12 | $b^4_{24}$ | $b^4_{23}$ | $b^4_{22}$ | $b^4_{21}$ | $b^4_{29}$ | $b^4_{27}$ | $b^4_{26}$ | $b^4_{25}$ |
| 13 | $b^4_{16}$ | $b^4_{15}$ | $b^4_{14}$ | $b^4_{13}$ | $b^4_{20}$ | $b^4_{19}$ | $b^4_{18}$ | $b^4_{17}$ |
| 14 | $b^4_7$ | $b^4_6$ | $b^4_5$ | $b^4_4$ | $b^4_3$ | $b^4_2$ | $b^4_9$ | $b^4_8$ |

| Slot No | Bit of TFCI code word | | | | | | | |
|---|---|---|---|---|---|---|---|---|
| 0 | $b^1_{1,15}$ | $b^1_{1,14}$ | $b^1_{1,13}$ | $b^1_{1,12}$ | $b^1_{2,15}$ | $b^1_{2,14}$ | $b^1_{2,13}$ | $b^1_{2,12}$ |
| 1 | $b^1_{1,11}$ | $b^1_{1,10}$ | $b^1_{1,9}$ | $b^1_{1,8}$ | $b^1_{2,11}$ | $b^1_{2,10}$ | $b^1_{2,9}$ | $b^1_{2,8}$ |
| 2 | $b^1_{1,7}$ | $b^1_{1,6}$ | $b^1_{1,5}$ | $b^1_{1,4}$ | $b^1_{2,7}$ | $b^1_{2,6}$ | $b^1_{2,5}$ | $b^1_{2,4}$ |
| 3 | $b^1_{1,3}$ | $b^1_{1,2}$ | $b^1_{1,1}$ | | $b^1_{2,3}$ | $b^1_{2,2}$ | $b^1_{2,1}$ | |
| 4 | $b^2_{1,14}$ | $b^2_{1,13}$ | $b^2_{1,12}$ | $b^2_{1,15}$ | $b^2_{2,14}$ | $b^2_{2,13}$ | $b^2_{2,12}$ | $b^2_{2,15}$ |
| 5 | $b^2_{1,10}$ | $b^2_{1,9}$ | $b^2_{1,11}$ | $b^2_{1,11}$ | $b^2_{2,10}$ | $b^2_{2,9}$ | $b^2_{2,11}$ | $b^2_{2,11}$ |
| 6 | $b^2_{1,6}$ | $b^2_{1,5}$ | $b^2_{1,8}$ | $b^2_{1,7}$ | $b^2_{2,6}$ | $b^2_{2,5}$ | $b^2_{2,8}$ | $b^2_{2,7}$ |
| 7 | $b^2_{1,1}$ | $b^2_{1,3}$ | $b^2_{1,2}$ | | $b^2_{2,1}$ | $b^2_{2,3}$ | $b^2_{2,2}$ | |
| 8 | $b^3_{1,13}$ | $b^3_{1,12}$ | $b^3_{1,15}$ | $b^3_{1,14}$ | $b^3_{2,13}$ | $b^3_{2,12}$ | $b^3_{2,15}$ | $b^3_{2,14}$ |
| 9 | $b^3_{1,9}$ | $b^3_{1,8}$ | $b^3_{1,11}$ | $b^3_{1,10}$ | $b^3_{2,9}$ | $b^3_{2,8}$ | $b^3_{2,11}$ | $b^3_{2,10}$ |
| 10 | $b^3_{1,4}$ | $b^3_{1,7}$ | $b^3_{1,6}$ | $b^3_{1,5}$ | $b^3_{2,4}$ | $b^3_{2,7}$ | $b^3_{2,6}$ | $b^3_{2,5}$ |
| 11 | $b^3_{1,0}$ | $b^3_{1,3}$ | $b^3_{1,2}$ | $b^3_{1,1}$ | $b^3_{2,0}$ | $b^3_{2,3}$ | $b^3_{2,2}$ | $b^3_{2,1}$ |
| 12 | $b^4_{1,11}$ | $b^4_{1,15}$ | $b^4_{1,14}$ | $b^4_{1,13}$ | $b^4_{2,11}$ | $b^4_{2,15}$ | $b^4_{2,14}$ | $b^4_{2,13}$ |
| 13 | $b^4_{1,7}$ | $b^4_{1,10}$ | $b^4_{1,9}$ | $b^4_{1,8}$ | $b^4_{2,7}$ | $b^4_{2,10}$ | $b^4_{2,9}$ | $b^4_{2,8}$ |
| 14 | $b^4_{1,3}$ | $b^4_{1,2}$ | $b^4_{1,5}$ | $b^4_{1,0}$ | $b^4_{2,3}$ | $b^4_{2,2}$ | $b^4_{2,5}$ | $b^4_{2,0}$ |

FIG. 11

| Slot No. | Bit of TFCI code word | | | | | | | |
|---|---|---|---|---|---|---|---|---|
| 0 | $b^1_{31}$ | $b^1_{30}$ | $b^1_{29}$ | $b^1_{28}$ | $b^1_{27}$ | $b^1_{26}$ | $b^1_{25}$ | $b^1_{24}$ |
| 1 | $b^1_{23}$ | $b^1_{22}$ | $b^1_{21}$ | $b^1_{20}$ | $b^1_{19}$ | $b^1_{18}$ | $b^1_{17}$ | $b^1_{16}$ |
| 2 | $b^1_{15}$ | $b^1_{14}$ | $b^1_{13}$ | $b^1_{12}$ | $b^1_{11}$ | $b^1_{10}$ | $b^1_{9}$ | $b^1_{8}$ |
| 3 | $b^1_{7}$ | $b^1_{6}$ | $b^1_{5}$ | $b^1_{4}$ | $b^1_{3}$ | $b^1_{2}$ | $b^1_{1}$ | $b^1_{0}$ |
| 4 | $b^2_{31}$ | $b^2_{30}$ | $b^2_{29}$ | $b^2_{28}$ | $b^2_{27}$ | $b^2_{26}$ | $b^2_{25}$ | $b^2_{24}$ |
| 5 | $b^2_{23}$ | $b^2_{22}$ | $b^2_{21}$ | $b^2_{20}$ | $b^2_{19}$ | $b^2_{18}$ | $b^2_{17}$ | $b^2_{16}$ |
| 6 | $b^2_{15}$ | $b^2_{14}$ | $b^2_{13}$ | $b^2_{12}$ | $b^2_{11}$ | $b^2_{10}$ | $b^2_{9}$ | $b^2_{8}$ |
| 7 | $b^2_{7}$ | $b^2_{6}$ | $b^2_{5}$ | $b^2_{4}$ | $b^2_{3}$ | $b^2_{2}$ | $b^2_{1}$ | $b^2_{0}$ |
| 8 | $b^3_{31}$ | $b^3_{30}$ | $b^3_{29}$ | $b^3_{28}$ | $b^3_{27}$ | $b^3_{26}$ | $b^3_{25}$ | $b^3_{24}$ |
| 9 | $b^3_{23}$ | $b^3_{22}$ | $b^3_{21}$ | $b^3_{20}$ | $b^3_{19}$ | $b^3_{18}$ | $b^3_{17}$ | $b^3_{16}$ |
| 10 | $b^3_{15}$ | $b^3_{14}$ | $b^3_{13}$ | $b^3_{12}$ | $b^3_{11}$ | $b^3_{10}$ | $b^3_{9}$ | $b^3_{8}$ |
| 11 | $b^3_{7}$ | $b^3_{6}$ | $b^3_{5}$ | $b^3_{4}$ | $b^3_{3}$ | $b^3_{2}$ | $b^3_{1}$ | $b^3_{0}$ |
| 12 | $b^4_{31}$ | $b^4_{30}$ | $b^4_{29}$ | $b^4_{28}$ | $b^4_{27}$ | $b^4_{26}$ | $b^4_{25}$ | $b^4_{22}$ |
| 13 | $b^4_{21}$ | $b^4_{19}$ | $b^4_{18}$ | $b^4_{17}$ | $b^4_{15}$ | $b^4_{14}$ | $b^4_{13}$ | $b^4_{11}$ |
| 14 | $b^4_{10}$ | $b^4_{9}$ | $b^4_{7}$ | $b^4_{6}$ | $b^4_{5}$ | $b^4_{3}$ | $b^4_{2}$ | $b^4_{1}$ |

FIG. 12

| Slot No. | Bit of TFCI code word | | | | | | | |
|---|---|---|---|---|---|---|---|---|
| 0 | $b^1_{1,15}$ | $b^1_{1,14}$ | $b^1_{1,13}$ | $b^1_{1,12}$ | $b^1_{2,15}$ | $b^1_{2,14}$ | $b^1_{2,13}$ | $b^1_{2,12}$ |
| 1 | $b^1_{1,11}$ | $b^1_{1,10}$ | $b^1_{1,9}$ | $b^1_{1,8}$ | $b^1_{2,11}$ | $b^1_{2,10}$ | $b^1_{2,9}$ | $b^1_{2,8}$ |
| 2 | $b^1_{1,7}$ | $b^1_{1,6}$ | $b^1_{1,5}$ | $b^1_{1,4}$ | $b^1_{2,7}$ | $b^1_{2,6}$ | $b^1_{2,5}$ | $b^1_{2,4}$ |
| 3 | $b^1_{1,3}$ | $b^1_{1,2}$ | $b^1_{1,1}$ | $b^1_{1,0}$ | $b^1_{2,3}$ | $b^1_{2,2}$ | $b^1_{2,1}$ | $b^1_{2,0}$ |
| 4 | $b^2_{1,15}$ | $b^2_{1,14}$ | $b^2_{1,13}$ | $b^2_{1,12}$ | $b^2_{2,15}$ | $b^2_{2,14}$ | $b^2_{2,13}$ | $b^2_{2,12}$ |
| 5 | $b^2_{1,11}$ | $b^2_{1,10}$ | $b^2_{1,9}$ | $b^2_{1,8}$ | $b^2_{2,11}$ | $b^2_{2,10}$ | $b^2_{2,9}$ | $b^2_{2,8}$ |
| 6 | $b^2_{1,7}$ | $b^2_{1,6}$ | $b^2_{1,5}$ | $b^2_{1,4}$ | $b^2_{2,7}$ | $b^2_{2,6}$ | $b^2_{2,5}$ | $b^2_{2,4}$ |
| 7 | $b^2_{1,3}$ | $b^2_{1,2}$ | $b^2_{1,1}$ | $b^2_{1,0}$ | $b^2_{2,3}$ | $b^2_{2,2}$ | $b^2_{2,1}$ | $b^2_{2,0}$ |
| 8 | $b^3_{1,15}$ | $b^3_{1,14}$ | $b^3_{1,13}$ | $b^3_{1,12}$ | $b^3_{2,15}$ | $b^3_{2,14}$ | $b^3_{2,13}$ | $b^3_{2,12}$ |
| 9 | $b^3_{1,11}$ | $b^3_{1,10}$ | $b^3_{1,9}$ | $b^3_{1,8}$ | $b^3_{2,11}$ | $b^3_{2,10}$ | $b^3_{2,9}$ | $b^3_{2,8}$ |
| 10 | $b^3_{1,7}$ | $b^3_{1,6}$ | $b^3_{1,5}$ | $b^3_{1,4}$ | $b^3_{2,7}$ | $b^3_{2,6}$ | $b^3_{2,5}$ | $b^3_{2,4}$ |
| 11 | $b^3_{1,3}$ | $b^3_{1,2}$ | $b^3_{1,1}$ | $b^3_{1,0}$ | $b^3_{2,3}$ | $b^3_{2,2}$ | $b^3_{2,1}$ | $b^3_{2,0}$ |
| 12 | $b^4_{1,15}$ | $b^4_{1,14}$ | $b^4_{1,13}$ | $b^4_{1,11}$ | $b^4_{2,15}$ | $b^4_{2,14}$ | $b^4_{2,13}$ | $b^4_{2,11}$ |
| 13 | $b^4_{1,10}$ | $b^4_{1,9}$ | $b^4_{1,7}$ | $b^4_{1,6}$ | $b^4_{2,10}$ | $b^4_{2,9}$ | $b^4_{2,7}$ | $b^4_{2,6}$ |
| 14 | $b^4_{1,5}$ | $b^4_{1,3}$ | $b^4_{1,2}$ | $b^4_{1,1}$ | $b^4_{2,5}$ | $b^4_{2,3}$ | $b^4_{2,2}$ | $b^4_{2,1}$ |

| $b^4_{1,12}$ | $b^4_{1,8}$ | $b^4_{1,4}$ | $b^4_{1,0}$ | $b^4_{2,12}$ | $b^4_{2,8}$ | $b^4_{2,4}$ | $b^4_{2,0}$ |
|---|---|---|---|---|---|---|---|

METHOD FOR IMPROVING TFCI TRANSPORTATION PERFORMANCE

BACKGROUND OF THE INVENTION

1. Field of the Invention

The present invention relates to a mobile telecommunication of third generation, and more particularly, to a method for transmitting a transport format combination indicator (TFCI) inserted to each time slot of a radio frame in a mobile telecommunication system using a W-CDMA standard.

2. Background of the Related Art

In general, the Third Generation Partnership Project (3GPP) group describes a definition of a physical channel of an upward link and a downward link of radio access network. Of the physical channel, Dedicated Physical Channel (DPCH) generally comprises three-layer structure of super frames, radio frames and timeslots. The DPCH has two types. The first type is a Dedicated Physical Data Channel (DPDCH) for transferring dedicated data, and the second type is a Dedicated Physical Control Channel (DPCCH) for transferring a control information.

Figure 1:
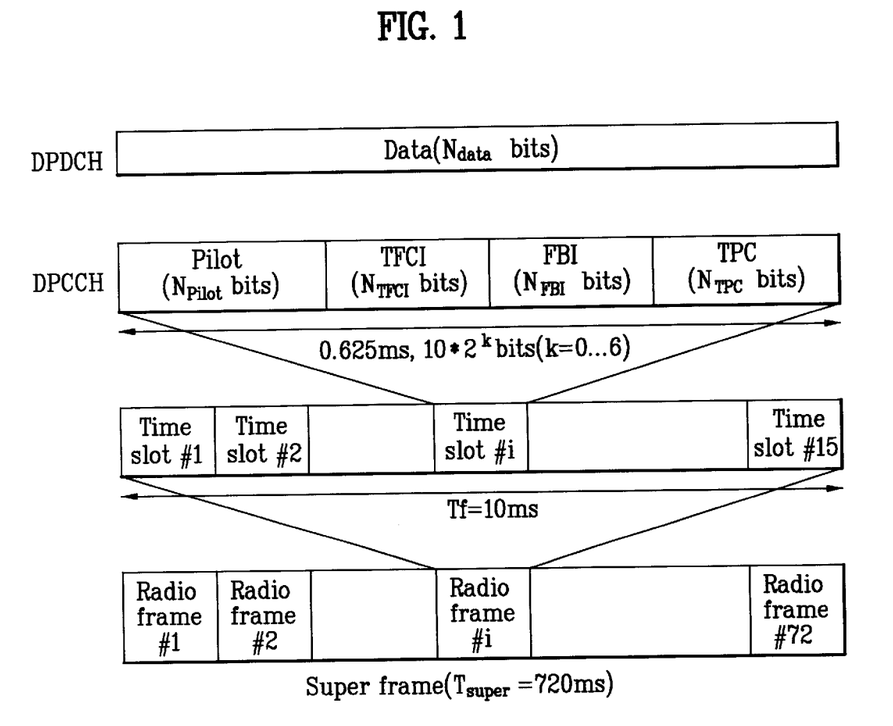
FIG. 1 illustrates a data structure of an upward link DPCH according to the standard of 3GPP Radio Access Network (RAN)
Figure 2:
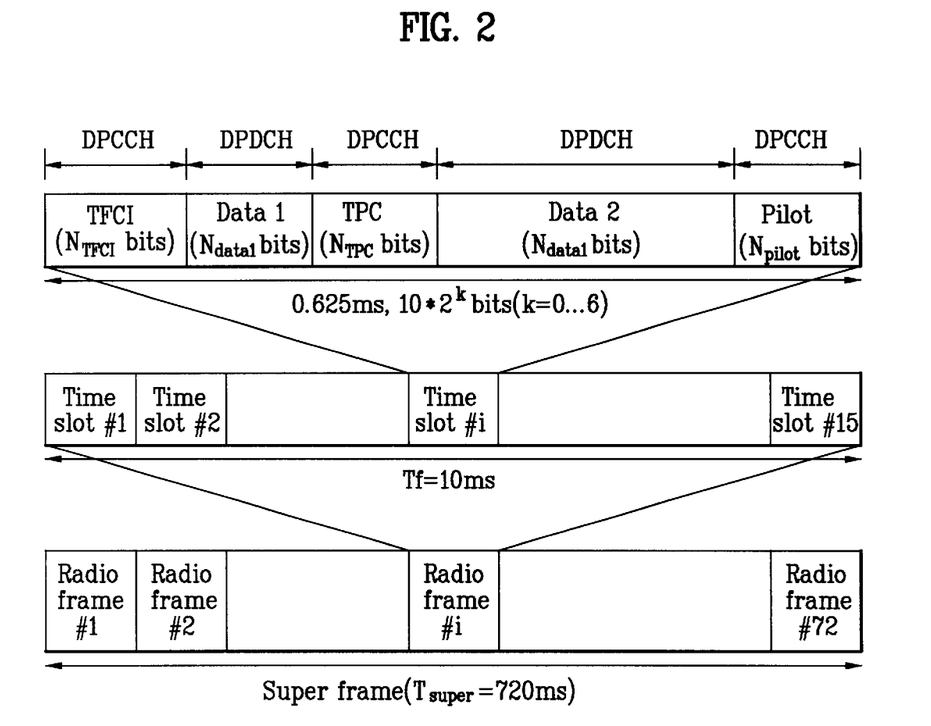
FIG. 2 illustrates a data structure of a downward link DPCH according to the standard of 3GPP Radio Access Network (RAN)

FIG. 1 shows a data structure of the upward link DPCH according to the standard of 3GPP Radio Access Network (RAN), and FIG. 2 shows a data structure of the downward link DPCH.

Referring to FIGS. 1 and 2, the DPCCH is provided with a TFCI field in each time slot of the radio frame. The TFCI bits are coded and inserted in each radio frame. In other words, information on a transmission format is coded and inserted into each radio frame. A coding of the TFCI bits according to the current 3GPP standard will now be explained herein below. The number of TFCI bits is variable from the minimum 1 bit to the maximum 10 bits, and the number of bits is determined from the point of time when a call starts by means of a signal processing of upper layer.

Different coding methods are applicable to such a TFCI. In other words, when the number of TFCI bits is less than 7, a bi-orthogonal coding, which is a first order Reed-Muller coding, is applicable. When the number of the TFCI bits is greater than 6, a second order Reed-Muller coding is applicable.

According to the current 3GPP standard, the coded sub-code once again undergoes a puncturing so as to generate a code word of 30 bit length.

For example, when the number of TFCI bits, which was determined by upper layer signaling, is less than 7, a TFCI code word is outputted through a bi-orthogonal coding. A (32, 6) coding is applicable to the bi-orthogonal coding. For that purpose, if the TFCI consists of less than 7 bits, a padding procedure is first undergone to supplement the deficient bit value with 0" from the Most Significant Bit (MSB).

The TFCI code word is inserted into each time slot of a radio frame by two bits. But, the entire length thereof is restricted to be 30 bits. Accordingly, the TFCI code word of 32 bits, which has undergone the bi-orthogonal coding, is punctured as much as 2 bits and inserted into each time slot.

For another example, because the number of TFCI bits determined by upper layer signaling is not more than 10, a TFCI code word is outputted through a second order Reed-Muller coding.

A (32, 10) coding is applicable to the second Reed-Muller coding. For that purpose, if the TFCI bits are less than or equal to 10, a padding procedure is first undergone to supplement the deficient bits with 0" from the MSB.

Figure 3:
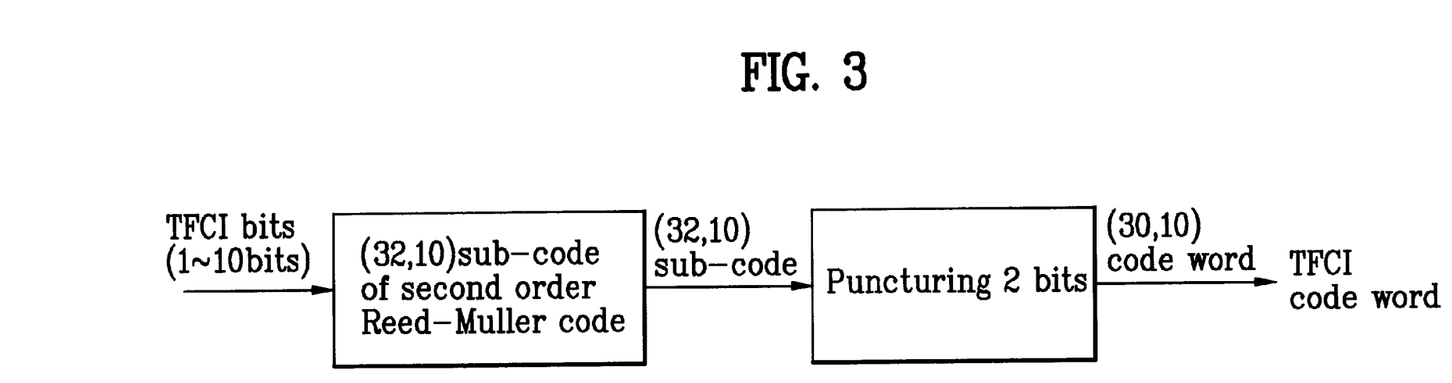
FIG. 3 illustrates a block diagram showing a channel coding process with respect thereto.

The Reed-Muller coded TFCI code word is referred to as a sub-code. The sub-code is punctured by two bits so as to generate a TFCI code word of 30 bit length. FIG. 3 is a block diagram illustrating a channel coding process with respect thereto.

The code word of 30bit length generated as described in the above is divided into fifteen double bit and inserted into each time slot for transfer.

Figure 4:
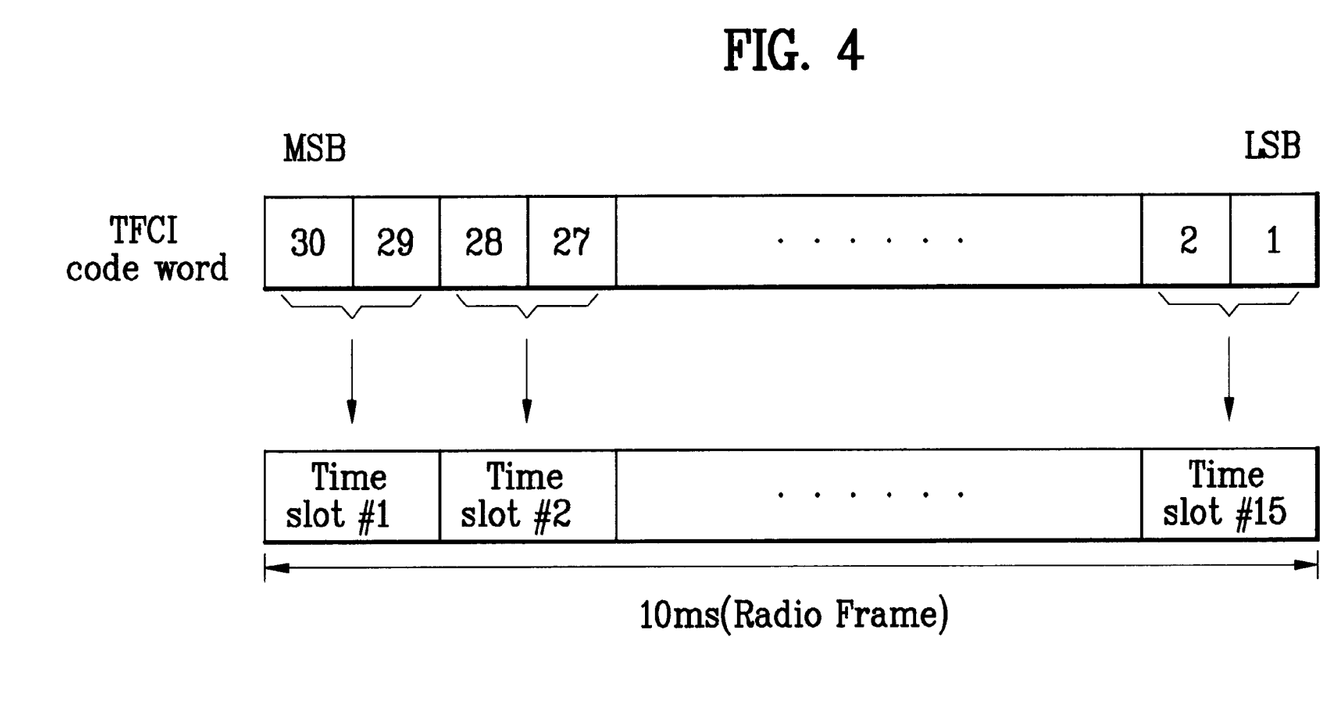
FIG. 4 illustrates a diagram showing insertion of the generally coded TFCI code word into each time slot.

FIG. 4 is a diagram showing insertion of the generally coded TFCI code word into each time slot.

Figure 5:
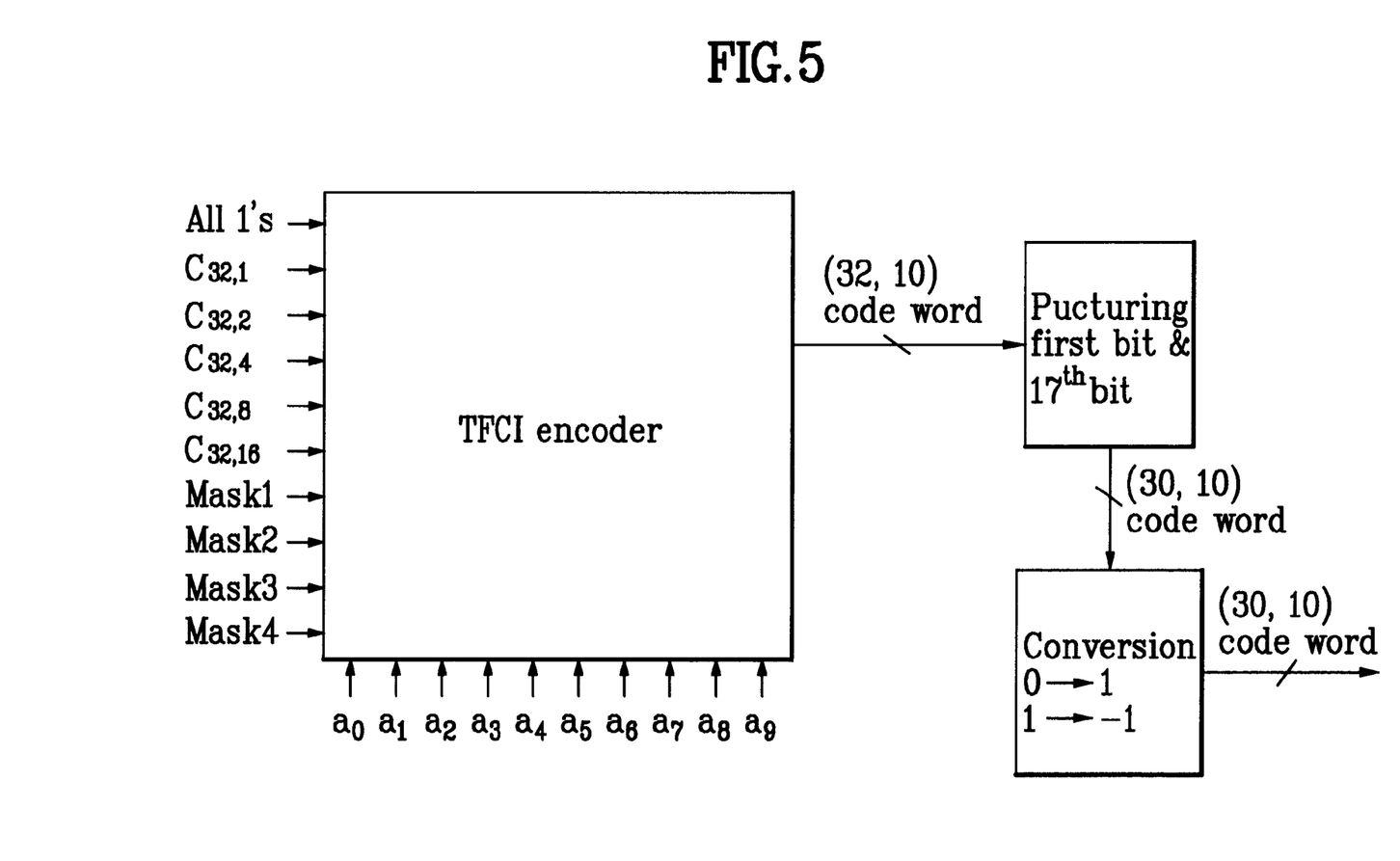
FIG. 5 illustrates a diagram illustrating an encoding structure for generating a (30, 10) TFCI code word.
Figure 6:
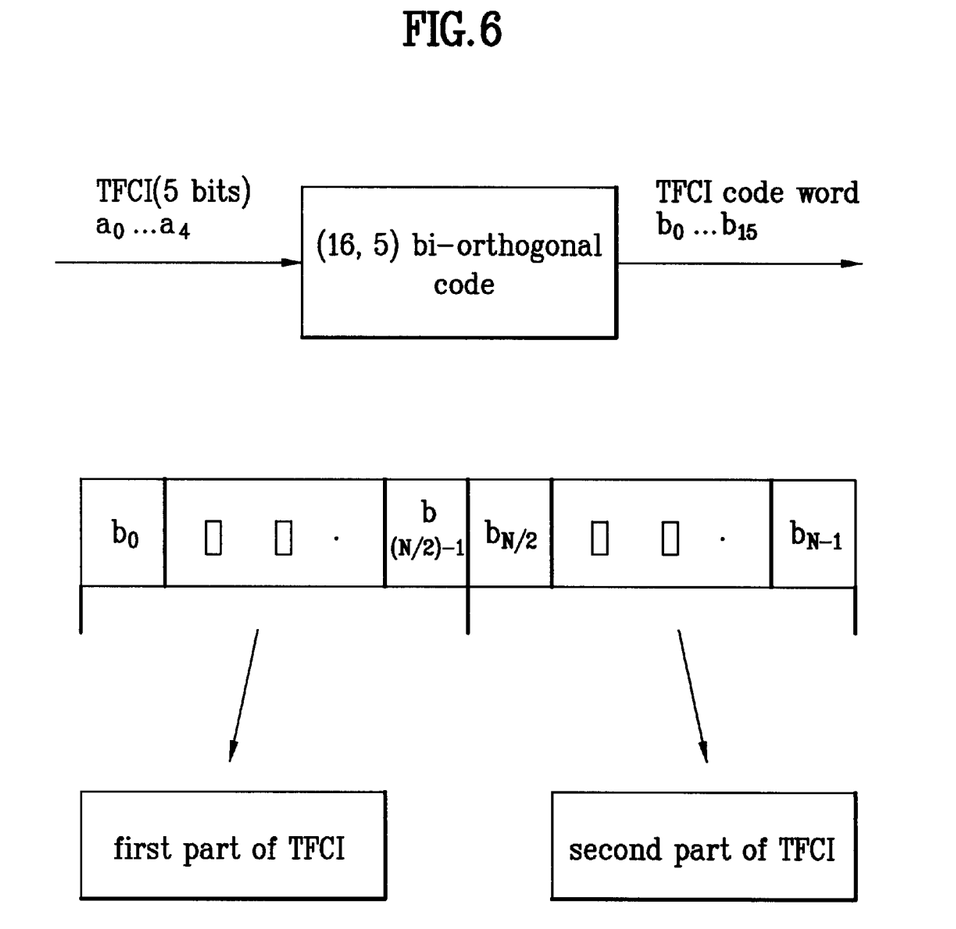
FIG. 6 illustrates a diagram showing an encoding structure for generating a (15, 5) TFCI code word of split mode.

FIG. 5 is a diagram illustrating an encoding structure for generating a (30, 10) TFCI code word.

Referring to FIG. 5, the TFCI bits variable from the minimum 1 bit to the maximum 10 bits are inputted to an encoder. The inputted data bit is lineally combined with 10 basis sequences.

The basis sequences (32 element vectors) used for the linear combination are comprised by a uniform code, in which all the bit values are 1"; five orthogonal variable spreading factor codes represented by (C32, 1, C32, 2, C32, 4, C32, 8, C32, 16) as shown in Table 1; and four mask codes represented by (Mask 1, Mask2, Mask3, Mask4) as shown in Table 2. Said four mask codes are used to increase the number of code word by 16 times in the conventional second order Reed-Muller coding.

TABLE 1

| C32,1  | 0000 0000 0000 0000 1111 1111 1111 1111 |
|--------|-----------------------------------------|
| C32,2  | 0000 0000 1111 1111 0000 0000 1111 1111 |
| C32,4  | 0000 1111 0000 1111 0000 1111 0000 1111 |
| C32,8  | 0011 0011 0011 0011 0011 0011 0011 0011 |
| C32,16 | 0101 0101 0101 0101 0101 0101 0101 0101 |

TABLE 2

| Mask1 | 0010 1000 0110 0011 1111 0000 0111 0111 |
|-------|-----------------------------------------|
| Mask2 | 0000 0001 1100 1101 0110 1101 1100 0111 |
| Mask3 | 0000 1010 1111 1001 0001 1011 0010 1011 |
| Mask4 | 0001 1100 0011 0111 0010 1111 0101 0001 |

However, the TFCI encoding according to the conventional technology as described above poses the following problems.

When two bits are punctured to generate a (30, 10) TFCI code word, which is inserted in the time slots and transmitted to the actual TFCI field from the (32, 10) code word, a minimum hamming distance loss is up to 2 at a maximum basis. Also, when a (16, 5) code word is punctured one bit to generate a (15, 5) TFCI code word, the maximum hamming distance loss is occurred in that case as well.

SUMMARY OF THE INVENTION

Accordingly, the present invention is directed to a method for improving a TFCI transportation performance that substantially obviates one or more of the problems due to limitations and disadvantages of the related art.

An object of the present invention is to provide a method for improving a TFCI transportation performance, which can code and decode TFCI information bits more efficiently without any increased hardware in the receiver side and transmitter side.

Another object of the present invention is to provide a method for preventing a reduction of a hamming distance caused by puncturing when code words are repeated before transportation of code words obtained by coding TFCI information bits.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for improving a TFCI transportation performance includes the steps of (1) coding TFCI information bits to be transported through each radio frame, (2) repeating a TFCI code word produced by the coding for an arbitrary times, (3) applying puncturing patterns different from each other to the repeated code words produced as many as the repeated times, and puncturing the repeated code words at locations different from each other, and (4) dividing, inserting, and transporting the punctured fixed length repeated code words in each slot of the radio frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 9 illustrates an example of a puncturing pattern for a repeated (30, 10) TFCI code word in accordance with a preferred embodiment of the present invention;

DETAILED DESCRIPTION OF THE PREFERRED EMBODIMENT

Reference will now be made in detail to the preferred embodiments of the present invention, examples of which are illustrated in the accompanying drawings. Currently, under the 3GPP standard, if an SF(Spreading Factor) is smaller than 128, bits of 30bit length TFCI code words are transported for four times, repeatedly. In this instance, the bits of the TFCI code words may be taken as (4,1) repititive codes are connected in series. Therefore, in the present invention, in a case the SF is smaller than 128, 32bit length TFCI code words are repeated, and different puncturing patterns are applied to respective units of the repeated code words. Since a decoder in the receiver side decodes the 30bit TFCI code words, punctured according to the foregoing puncturing pattern, by using a decoding method in which the 32bits are transferred completely, not only a reduction of a hamming distance caused by the puncturing, but also deterioration of the transporation performance can be prevented.

Moreover, in the current 3GPP standard which is based on 30bit code word transport for each radio frame, a related art receiver side decoder receives 15bit code words, or 30bit code words, and conducts decoding limited to the received code words, because such TFCI code words are obtained by puncturing 32bit length code words provided according to the Reed-Muller coding having (32, 10) coding applied thereto. However, in the present invention, since the receiver side decoder can be embodied the same as a case when the 32bit code words are transported completely, the present invention is based on a decoding for 16bit or 32bit code words, which is implemented by puncturing a base code word coded according to a basic principle for fixing a puncturing position to be explained, later. The example that bits of 30bit length TFCI code word under the current 3GPP standard are tranported repeatedly is applied to a case a TTI(Transport Time Interval) exceeds 10 ms(i.e., respective cases of 20 ms, 40 ms, and 80 ms), in other words, if the TTI exceeds 10 ms, the same TFCI information is inserted in many radio frames before transport. Since the present invention can embody the receiver side decoder the same as the case when the 32bit code word is transported completely even in such a case, the present invention is based on 16bit or 32bit code word decoding, which is also implemented by puncturing a base code word coded according to a basic principle for fixing a puncturing position to be explained, later.

And, when a transport mode of a radio frame is in operation, not in a standard mode, but in compressed mode in an uplink or a downlink in the related art, the repetition for bits of the TFCI code words are, not an interred time, but repeated for only a portion of entire code word bits. And, in this instance, it is preferable that a section with inadequate power control coming after a transmission gap is repeated when the transport mode of the radio frame is in operation in a compressed mode in an uplink. The compressed mode (=slotted mode) is a mode in which data is not transported for a period through a frame for interfrequency handover or the like in an uplink and downlink, when a frame structure is changed suitable for it and the TFCI code words and the bits are repeated according to conditions.

A method for improving TFCI transportation performance in accordance with a preferred embodiment of the present invention will be explained.

A coded base code word is denoted as (B, A), and a code word obtained by puncturing the (B, A) code word is denoted as (C, A) code word. There is a relation between the code words that "B−C= a number of bits punctured per a code word 'P' (P>0)". When bits of the TFCI code word is repeated for N times, the entire repeated code may be considered to be a series of (C*N, A*N) code word blocks, which is identical to (B*N, A*N) code word blocks having repeated bits after being punctured as many bits as P*N {=(B−C)*N}. The foregoing process has a system as shown in FIG. 1.

Figure 7:
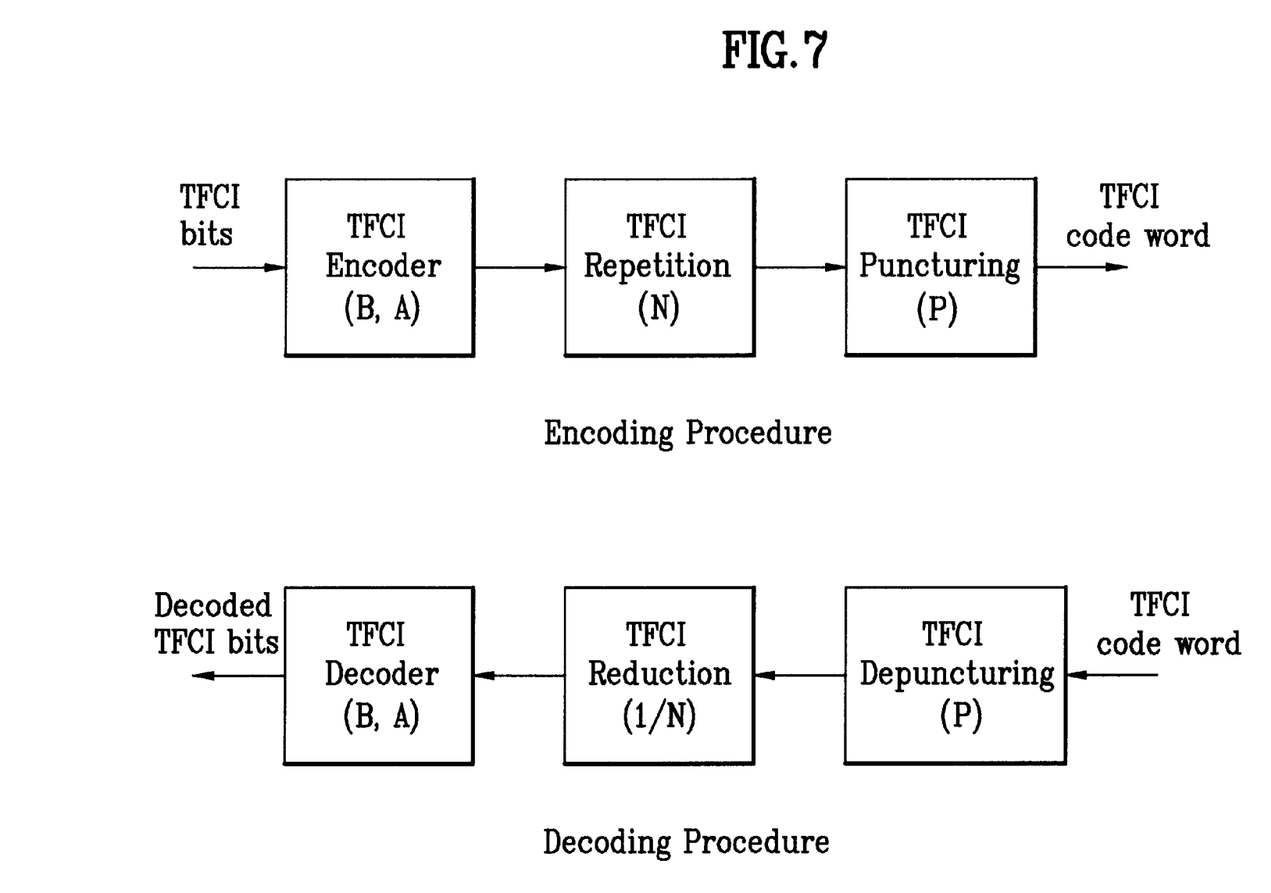
FIG. 7 illustrates a block diagram of a device the present invention is embodied therein.

In a depuncturing step in a decoding process in FIG. 7, '0' is inserted in every 'P' number of punctured positions, to provide the (B, A) code word required in the decoding process. In a reduction step in the decoding process in FIG. 7, the N (B, A) code words formed by the depuncturing is subjected to average summation to combine code word values, to form (B, A) code words required for a TFCI decoding. The code word before being punctured is defined as an equation (1), and the code word block obtained by repeating bits of the TFCI code word is defined as an equation 2.

$$x_0, x_1, x_2, \cdots x_{B-2}, x_{B-1} \tag{1},$$

$$y_0, y_1, y_2, \cdots y_{NB-2}, y_{NB-1} \tag{2}.$$

In this instance, there is a relation between the equation (1) and the equation (2) expressed as an equation, below.

$$y_{((m-1)B+i) \bmod B} = x_i \tag{3},$$

where, "k mod B" denotes a remainder when 'k' is divided by 'B'. When 'B' is 32, the 'i' can be a value falling between 0 to 32.]

In a first embodiment of the present invention, a location at which the repetition occurrs less in the (B, A) code word is fixed according to the following equation (4), which is the simplest embodiment done by puncturing the code words at fixed locations.

$$P=(j+K) \bmod B, (j=0, 1, \cdots, P \cdot N-1) \tag{4},$$

Third, when a code word block is formed by a combination of individual code words, locations of bits having repeated for less number of times are made to be distributed uniformly over the entire code word block by means of the puncturing.

Fourth, locations of consecutive puncturing should be far as much as possible.

For meeting the above basic principles, the locations of bits in the (B, A) code word having repeated for less number of times are fixed according to an equation (5), below.

$$r_i=[(B/P(P \cdot N) \cdot i]+K, (i=0, 1, \cdots, P \cdot N-1) \tag{5},$$

where, K is a constant greater than '0' and [x] denotes a greatest integer not greater than x.

Accordingly, the locations of puncturing which meet the above basic principles can be expressed as equations (6), (7), (9), and (10), where $P_{ij}$ denotes a puncturing location, obtained from $y_{pij}$, denoting a (j)th puncturing position in an (i)th repeated code in the code word block obtained by repeating the bits of the TFCI code words shown in the equation (2), i=0, 1, - - - , N−1, j=0, 1, - - - , P−1, and K is an integer greater than '0'.

$$P_{ij}=[B/P \cdot j+B/(P \cdot N) \cdot i]+B \cdot i+K \tag{6},$$

where, [x] denotes a greatest integer not greater than 'x'.
If B/P and B/(P·N) in the equation (6) are integers, the equation (6) can be expressed as an equation (7), below.

$$P_{ij}=B/P \cdot j+B/(P \cdot N) \cdot i+B \cdot i+K \tag{7}$$

and, when N=$2^n$, an equation (8) below can be obtained.

$$P_{ij}=B/P \cdot j+B/(P \cdot N) \cdot R(i, n)+B \cdot i+K \tag{8},$$

where, R(i, n) denotes binary 'i' bit reversed into decimal 'i' with reference to 'n' bit, i.e., R($4_{10}$=$100_2$, 3)=$001_2$=$1_{10}$.

And, when P=$2^P$, the following equation (9) can be obtained, where, alike a case of the equation (8), R(j, p) denotes binary 'j' bit reversed into decimal 'j' with reference to 'p' bit.

$$P_{ij}=B/P \cdot R(j, p)+B/(P \cdot N) \cdot R(i, n)+B \cdot i+K \tag{9}.$$

Other than those, if expression of 'N' or 'P' as (n)th power of 2 is impossible, by selecting i, j indices in MIL(Multi-stage interleaving), the following equation (10) may be used for production of a puncturing pattern.

$$P_{ij}=B/P \cdot M_1(j)+B/(P \cdot N) \cdot M_2(i)+B \cdot i+K \tag{10},$$

where, $M_1(*)$ and $M_2(*)$ are functions for selecting the MIL patterns within ranges of 0~(P−1) and 0~(N−1). That is, the $M_1(i)$ and $M_2(j)$ in the equation (10) means that reading 'i' and 'j' in rows and writing the 'i' and 'j' in columns. For reference, the MIL is a method in which a bitstream is received, written in row units on an interleaver memory, reads in column units, to provide a bitstream, one of which is the following index selection method by bit reversing. As an example of the bit reversing, when a bit value representing a column number from which the interleaved bit stream is provided is 8bits, a sequence of column numbers "0 1 2 3 4 5 6 7" are expressed in binary number, and bit values of which are inverted, i.e., inverted in forms of "0(000)→0(000)", "1(001)→4(100)", "2(010)→2(010)", "3(011)→6(110)", and etc., to provide a columnar bitstream of "0 4 2 6 1 5 3 7".

A method for improving a TFCI performance transportation of the present invention will be explained, taking a case as an example when bits of the TFCI code word are repeatedly transported when the SF is smaller than 128 in the present 3GPP standard.

Figure 8:
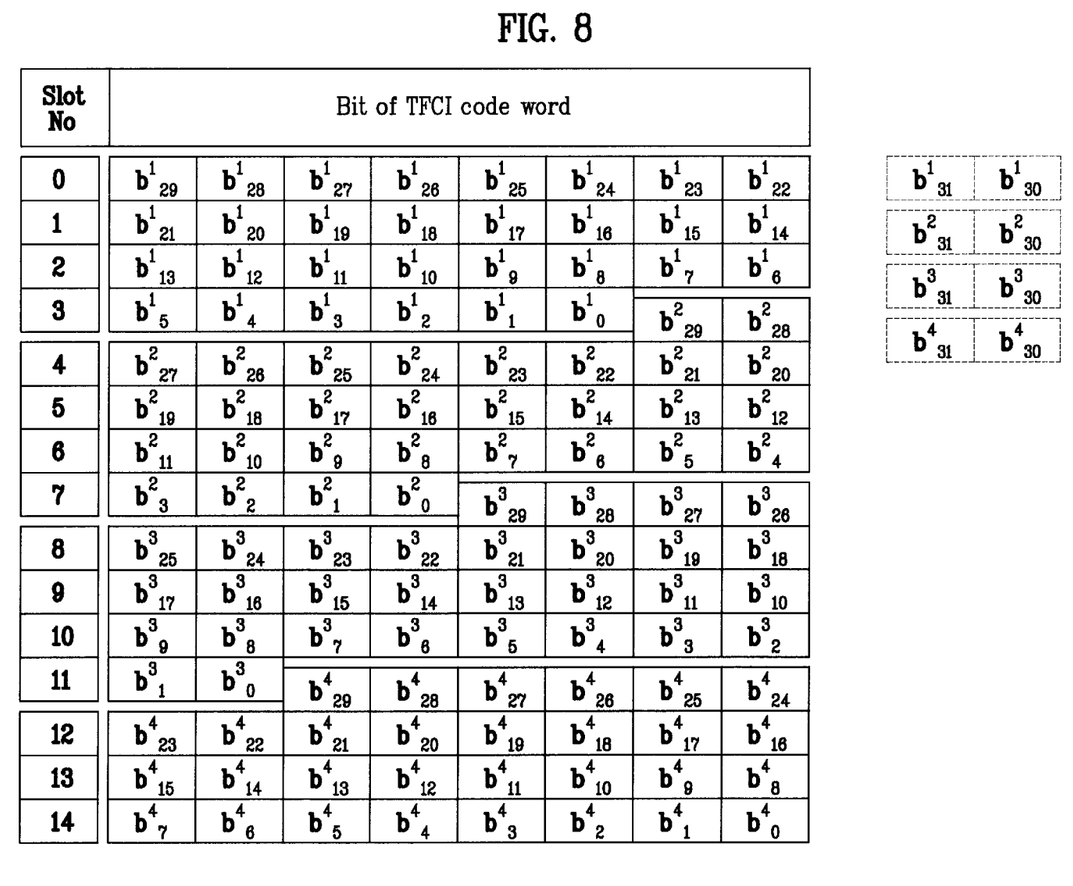
FIG. 8 illustrates a repeated pattern of bits of a (30, 10) TFCI code word.

The present TFCI code words employed in the 3GPP standard is (30, 10) Reed-Muller code and (15, 5) Reed-Muller code. TFCI bit number received for coding varies from minimum 1bit to maximum 10bits, which is fixed at a moment signal transmission is started after processing of signal at an upper layer. The (30, 10) Reed-Muller code is obtained by puncturing a first and a seventeenth bits of a (32, 10) sub-code produced by a second order Reed-Muller coding, and the (15, 5) Reed-Muller code is obtained by puncturing a first bit of a (16, 5) sub-code produced by a second order Reed-Muller coding. Particularly, the (15, 5) Reed Muller code is used when a frame transport mode is a split mode, and a combination of the two (15, 5) Reed-Muller codes forms a (30, 10) TFCI code word, and puncturing positions for the entire repeated TFCI code words are the same with puncturing positions on (30, 10) Reed-Muller code, at the end. When the SF is smaller than 128, bits of the (30, 10) TFCI code word are repeated for four times, to form a pattern having 4 four repeated codes connected in series as shown in FIG. 8. When the repeated pattern in FIG. 8 is punctured according to the present invention, a pattern as shown in FIG. 9 is obtained, when N=4, P=2, B=32, and K=0 in the equation (6). When pj is calculated by the equation (6) of the present invention and a required puncturing is carried out in a split mode when (15, 5) TFCI code word is used, a pattern in FIG. 10 can be obtained. In this instance, N=4, P=1, B=16, and K=0 in the equation (6). Thus, in the present invention, when the SF is smaller than 128, bits of the code word are repeated and different puncturing patterns are applied to respective repeated code block units.

Figure 11:
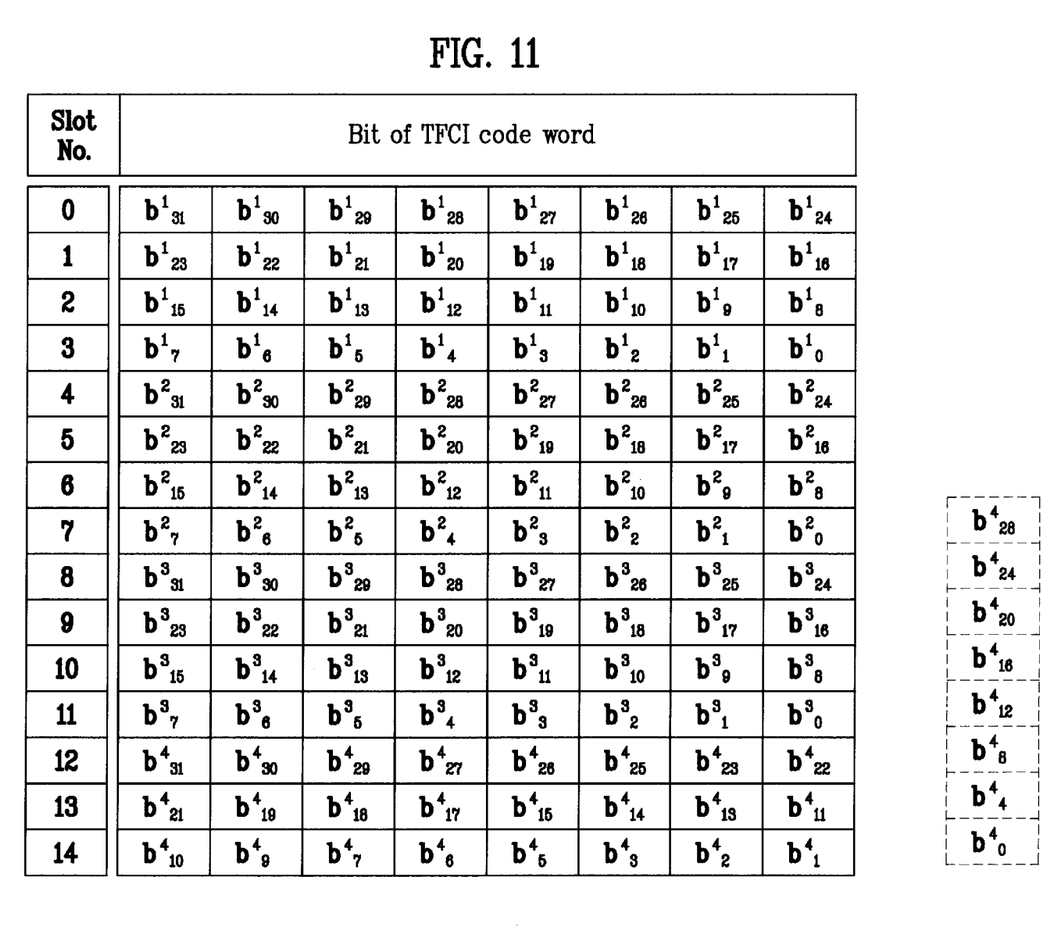
FIG. 11 illustrates another example of a puncturing pattern for a repeated (30, 10) TFCI code word in accordance with a preferred embodiment of the present invention; and, FIG. 12 illustrates another example of a puncturing pattern for a (15, 5) TFCI code word in a split mode in accordance with a preferred embodiment of the present invention.
Figure 12:
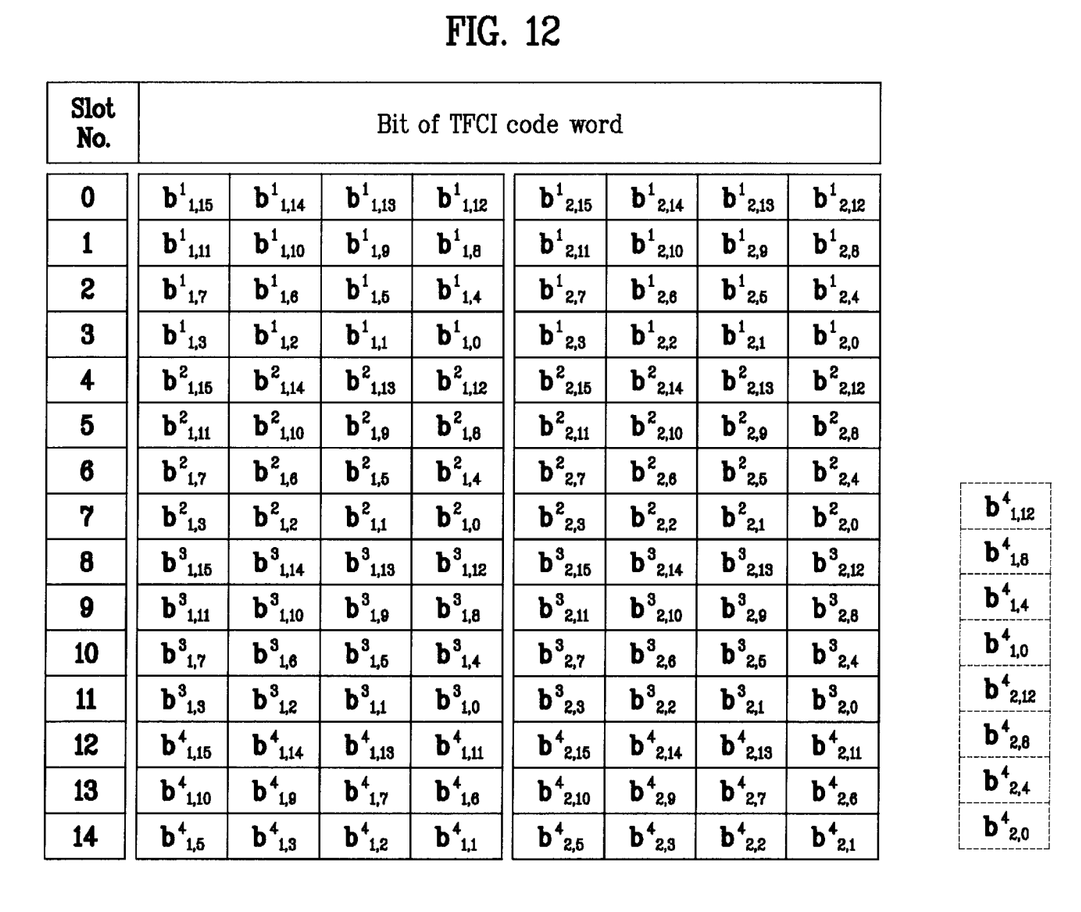

In addition to this, different from the equations (6)~(10), when a bit to be punctured in the repeated TFCI code word for meeting the aforementioned basic principles in the present invention is represented as Ypj, and an index pj of the bit to be punctured can be expressed as an equation (11).

$$P_j=[B/(P\,N)j]+IB+K \quad (11),$$

where, [x] represents a greatest integer not greater than X, K denotes a constant greater than or equal to '0', 'I' denotes any interger from '0' to (N−1), but may be '0' or (N−1) for simplification. In this case, puncturing is occurred for particular repeated codes among the four repeated codes as shown in FIGS. 11 and 12.

Figure 10:
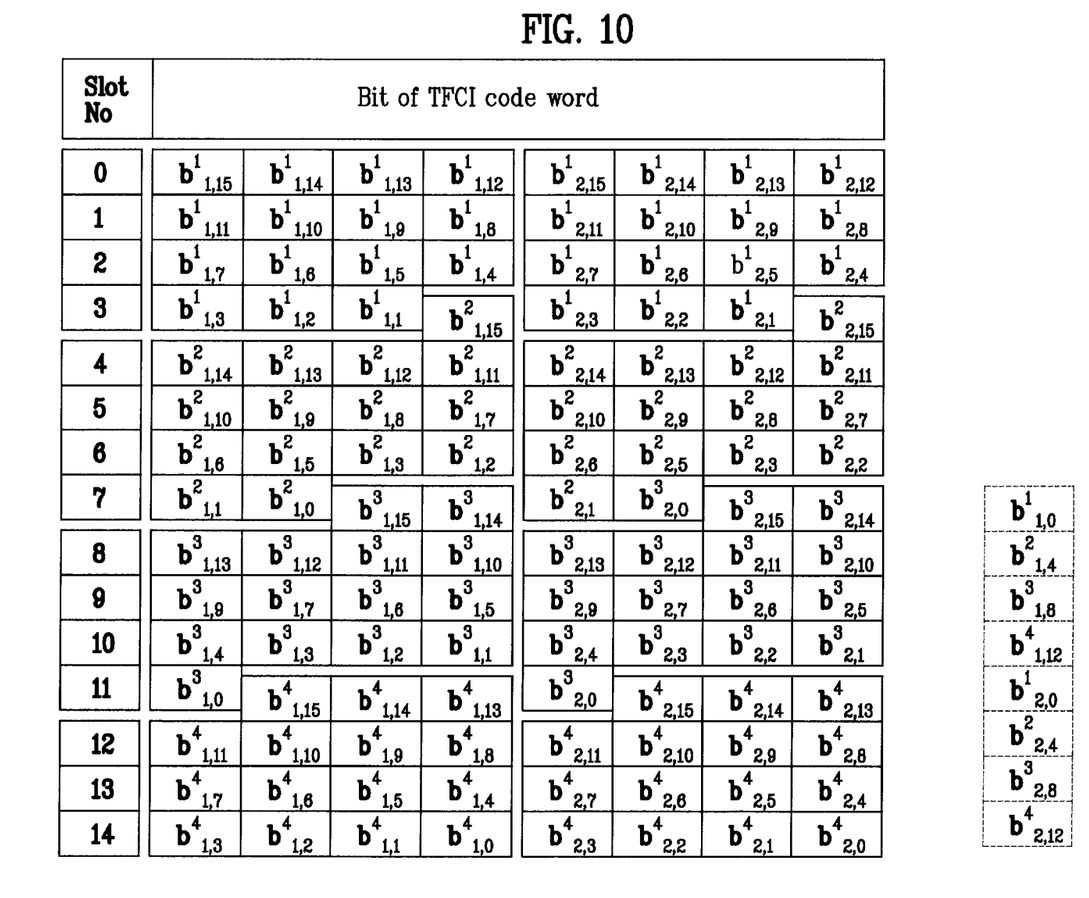
FIG. 10 illustrates an example of a puncturing pattern for a (15, 5) TFCI code word in a split mode in accordance with a preferred embodiment of the present invention.

A method for improving a TFCI performance transportation in accordance with a third embodiment of the present invention will be explained, taking a case as an example, when the SF is smaller than 128 and a TTI exceeds 10 ms in the first and second embodiments in repeating and transporting bits of the TFCI code word. In this instance, when a repeating number of times according to each TTI is defined by an equation 12, Pij and Pj, a puncturing position for each case when applied to equations 6~11 with N=nTT, P=2, B=32, K=0, may be fixed. For example, when TTI is 40 ms, the related art repeated pattern is identical to a pattern in FIG. 8, and when Pij is calculated according to equations (6)~(10) for fixing puncturing positions for the repeated pattern, and the puncturing is carried out, a pattern shown in FIG. 9 or 10 is obtained, when N=4, P=2, B=32, K=0 are applied to equations 6~10. And, when TTI is 80 ms, identical parameters except N=8 are applied to equations (6)~(10). In this instance too, different from the equations (6)~(10), when a bit to be punctured in the repeated TFCI code word for meeting the aforementioned basic principles in the present invention is represented as Ypj, and an index pj of the bit to be punctured can be expressed as an equation (11). In this case, puncturing is occurred for particular repeated codes among the four repeated codes as shown in FIGS. 11 and 12.

The following equation (12) is an equation for calcualting nTTI defined newly for calulating 'N'.

$$nTTI=TTI/10\ ms \quad (12),$$

A fourth embodiment of the present invention will be explained, when the frame trasnport mode is operative in a compressed mode on uplink and downlink. The TFCI code word is defined as an equation (13), and in the compressed mode, the number of bits available in the TFCI fields of one radio frame is defined as D and repeated bits in the TFCI code words are defined as dk.

$$c_0, c_1, c\ c, c_3, c_4, \text{- - -}, c_m\ (\text{where}, m=29) \quad (13),$$

In this instance, an intermediate parameter 'E' for obtaining a repeated bits $d_k$ in an equation (15) is defined as an equation (14), below.

$$E=30-1-(N_{first}\,N_{TFCI})\,\text{mod}\,30 \quad (14),$$

where, $N_{TFCI}$ denotes the number of bits in the TFCI field in a slot, and $N_{first}$ denotes the number of the first TFCI bit in the slot directly after the TG(Transmission gap).

$$d_{D-31}=c_{E\,mod\,30},\ d_{D-32}=c_{(E-1)mod\,30},\ d_{D-33}=c_{(E-2)mod\,30},\ K,\ d_0=c_{\{E-(D-31)\}mod\,30} \quad (15).$$

That is, if a length of the TFCI code word to be transported in a compressed mode is longer than a coded 30bit TFCI code word, the TFCI code word in the compressed mode is produced by repeating bits of the TFCI code word to be inserted in a slot next to slots at which TGL (Transmission Gap Length) of a frame end among the coded 30bit TFCI code word, for minimizing an influence from imperfect power control occurred during the TGL.

In a case D>32 in the present invention, for converting the equation (15) into an equation having a subscript m=32, the parameter 'E' in the equation (14) may be defined as 'L' as in an equation (16), and the equation (15) can be converted into an equation (17).

$$L=32-1-(N_{first}\,N_{TFCI})\,\text{mod}\,32 \quad (16),$$

$$d_{D-33}=c_{L\,mod\,32},\ d_{D-34}=c_{(L-1)mod\,32},\ d_{D-35}=c_{(L-2)mod\,32},\ K,\ d_0=c_{\{L-(D-33)\}mod\,32} \quad (17).$$

When D=31 and D=32, the radio frame transports, not after repeating a portion of bits of the 30bit coded TFCI code word, but the 31bit or 32bit coded TFCI code word as it is.

As has been explained, the method for improving a TFCI transportation performance of the present invention has the following advantatges.

Because the present invention can embody a receiver side decoder identical to a case when a 32bit code word is transmitted perfectly, a receiver side device is not become complicate based on decoding for 16bit or 32bit code word.

Particularly, if the spreading factor is smaller than 128, bits of the code word are repeated, different puncturing patterns are applied to each of the repeated code block unit, even if TTI exceeds 10 ms(i.e., 20 ms, 40 ms, 80 ms), a TFCI information transportation performance is improved, and the receiver side decoder can be embodied identical to a case when a 32 bit code word are transported perfectly.

And, when the radio frame is operative, not in a standard mode, but a compressed mode, in an uplink and a downlink, the TFCI information transportation performance can be improved.

It will be apparent to those skilled in the art that various modifications and variations can be made in the method for improving a TFCI transportation performance of the present invention without departing from the spirit or scope of the invention. Thus, it is intended that the present invention cover the modifications and variations of this invention provided they come within the scope of the appended claims and their equivalents.

What is claimed is:

1. A method for transmitting a Transport Format Combination Indicator(TFCI) in a wireless communication system, comprising the steps of:
   (1) coding TFCI information bits into TFCI code word;
   (2) repeating said TFCI code word for predetermined times;
   (3) selecting bits from the repeated code word so that the bits to be selected can be dispersed in the code word block which is obtained by repeating the bits of the TFCI code word;
   (4) puncturing the selected bits from the repeated code word; and,
   (5) transmitting the code word over a radio frame.

2. A method as claimed in claim 1, wherein the repetition is determined by a spreading factor or a transport time interval of the frame or a transport mode of the frame.

3. A method as claimed in claim 1, wherein the selecting is done by uniformly dispersing the bits to be selected in the code word block obtained by repeatin the bits of the TFCI code word.

4. A method as claimed in claim 3, wherein a location of a bit at which repetition is occurred relatively less in a repeated code word bit-stream is (J+K)mod B, where K denotes a non-negative integer, B denotes a TFCI code word length, P denotes a number of bits to be punctured in the TFCI code word, N denotes a repeated number of the TFCI code word, and j denotes an index increasing from 0 to P*(N−1).

5. A method as claimed in claim 3, wherein a location of a bit at which repetition is occurred relatively less in a repeated code word bit-stream is ri=[B/(PN)i]+K, where K denotes a positive integer, B denotes a TFCI code word length, P denotes a number of bits to be punctured in the TFCI code word, N denotes a repeated number of the TFCI code word, i denotes an index increasing from 0 to P*(N−1), and [x] denotes a greatest integer not greater than x.

6. A method as claimed in claim 3, wherein, if B denotes a length of the TFCI code word, N denotes the number of the repetition times of the TFCI code word, P denotes the number of bits of the TFCI code word to be punctured, k denotes a non-negative integer, and $P_{ij}$ denotes an element of the repeated TFCI code word to be punctured, at a (j)th posintion and an (i)th repeated code in the code word block obtained by repeatin the bits of the TFCI code word, the relationship is:

$$P_{ij}=[B/Pj+B/(PN)i]+Bi+K,$$

wher [x] represents a greatest integer not greater than x and i=0,1, . . . , N−1, j=1,1, . . . , P−1.

7. A method as claimed in claim 3, wherein said TFCI code word which is coded from TFCI information bits are comprised of 32 elements.

8. A method as claimed in claim 7, wherein, when D>32, where D denotes the number of bits available in the TFCI fields of one radio frame, $d_k$ denotes repeated bits of the TFCI code word, $N_{TFCI}$ denotes the number of bits in the TFCI field in a slot, $N_{first}$ denotes the number of the first TFCI bit in the slot directly after the TG(Transmission gap), and L=32−1−($N_{first}$ $N_{TFCI}$)mod 32, the repeated bits are denoted as $d_{D-33}=c_{Lmod32}$, $d_{D-34}=c_{(L-1)mod32}$, $d_{D-35}=c_{(L-2)mod\ 32}$, . . . , $d_0=c_{\{L-(D-33)\}mod32}$.

9. The method of claim 1, wherein, after the step (2), of the repeated code words produced as many as the repeated number of times, the puncturing is conducted for bits at predetermined locations for particular repeated code words.

10. The method of claim 9, wherein if 'P' denotes a number of punctured bits in the TFCI code word, 'N' denotes a repeated number of times of the TFCI code word, 'k' denotes an integer greater than '0', 'K' denotes a positive integer, 'I' is an index having a value between 0~N−1, and 'j' denotes an increasing index from '0' to '(N·P−1)', a location of a bit to be punctured Pj can be expressed as follows:

$$Pj=[B/(P\cdot N)\cdot j]+IB+K,$$

where [x] denotes a greatest integer not greater than 'x'.

11. The method of claim 1, wherein the TFCI code word uses a (32, 10) Reed-Muller code for TFCI information bits below 10 bits.

12. The method of claim 1, wherein when the frame transport mode is a split mode, the TFCI code word uses a (16, 5) Reed-Muller code for TFCI information bits below bits.

13. A method of compressing a transport format combination indicator (TFCI), comprising:
  repeating a TFCI having a first prescribed number of bits for a prescribed number of repetitions to form a TFCI repeated code word;
  selecting a second prescribed number of bits from at least one of the repeated TFCI that form the TFCI repeated code word, such that for each selected bit, a corresponding bit in each of the remaining TFCI is not selected; and
  removing the selected bits from the at least one TFCI repeated code words to form a compressed TFCI repeated code word.

14. The method of claim 13, wherein each of the second prescribed number of bits is selected from a single one of the repeated TFCI.

15. The method of claim 14, wherein each of the selected bits is selected from a final one of the repeated TFCI.

16. The method of claim 14, wherein an index of the bits to be selected from the TFCI is determined by summing (a) the resultant of the first prescribed number of bits in the TFCI, divided by a product of the second prescribed number of bits multiplied by the prescribed number of repetitions multiplied by a counter value indicating which one of the second prescribed number of bits is being determined; plus (b) a product of a counter value indicating from which of the number of repetitions the selected bits are located multiplied by the first prescribed number of bits in the TFCI; plus (c) a constant value, wherein each of the counters begins at '0', and wherein the constant value can be '0'.

17. The method of claim 16, wherein the first prescribed number of bits is 32, the second prescribed number of bits is '8', and the number of repetitions is '4'.

18. The method of claim 13, wherein the second prescribed number of bits is selected in equal proportions from each of the repetitions of the TFCI, each equal proportion containing a third prescribed number of bits.

19. The method of claim 18, wherein a location of the bits to be selected from each of the prescribed number of repetitions of the TFCI is determined by summing (a) the dividend of the first prescribed number of bits in the TFCI, divided by a product of the third prescribed number of bits multiplied by a counter value indicating which of the second prescribed number of bits to be selected is being determined; plus (b) a dividend of the first prescribed number of bits in the TFCI, divided by a product of the third prescribed number of bits multiplied by the prescribed number of repetitions of the TFCI multiplied by a counter value indicating the repetition for which the bit is being selected; plus (c) a product of the first prescribed number of bits in the TFCI multiplied by the counter value indicating the repetition for which the bit is being selected; plus (d) a constant value, wherein each of the counters begins at '0', and wherein the constant value can be '0'.

20. The method of claim 19, wherein the first prescribed number of bits is '32', the second prescribed number of bits is '8', the third prescribed number of bits is '2' and the number of repetitions is '4'.

21. The method of claim 19, wherein the first prescribed number of bits is '16' and the second prescribed number of bits is '1'.

22. The method of claim 13, wherein the first prescribed number of bits is '32', the prescribed number of repetitions is '4', and the second prescribed number of bits is '2'.

23. The method of claim 13, wherein the transport time interval exceeds 10 ms.

24. The method of claim 13, wherein the compressed TFCI is used in at least one of an uplink and a downlink.

25. A user equipment (UE) for a mobile communication system, comprising:
  means for forming a transport format combination indicator (TFCI) having a first prescribed number of bits to be transported through a radio frame;

means for repeating the TFCI for a prescribed number of repetitions to form a TFCI repeated code word;

means for selecting a second prescribed number of bits from at least one of the repeated TFCI that form the TFCI repeated code word, such that for each selected bit, a corresponding bit in each of the remaining TFCI is not selected;

means for removing the selected bits from the TFCI repeated code word to form a punctured TFCI repeated code word; and means for forming the compressed TFCI repeated code word into the radio frame to be transported.

26. The UE of claim 25, further comprising means for receiving a radio frame having a compressed TFCI repeated code word and means for extracting the TFCI from the compressed TFCI repeated code word.

27. The UE of claim 25, wherein the means for selecting the second prescribed number of bits selects each of the second prescribed number of bits from a single one of the repeated TFCI, and wherein a location of the bits to be selected from the TFCI is determined by summing (a) the resultant of the first prescribed number of bits in the TFCI, divided by a product of the second prescribed number of bits multiplied by the prescribed number of repetitions multiplied by a counter value indicating which one of the second prescribed number of bits is being determined; plus (b) a product of a counter value indicating from which of the number of repetitions the selected bits are located multiplied by the first prescribed number of bits in the TFCI; plus (c) a constant value, wherein each of the counters begins at 0, and wherein the constant value can be 0.

28. The UE of claim 27, wherein the means for selecting the second prescribed number of bits selects the bits in equal proportions from each of the repetitions of the TFCI, each proportion being a third prescribed number of bits in size.

29. The method of claim 28, the means for selecting the second prescribed number of bits identifies a location of each bit to be selected from each of the prescribed number of repetitions of the TFCI by summing (a) the dividend of the first prescribed number of bits in the TFCI, divided by a product of the third prescribed number of bits multiplied by a counter value indicating which of the second prescribed number of bits to be selected is being determined; plus (b) a dividend of the first prescribed number of bits in the TFCI, divided by a product of the third prescribed number of bits multiplied by the prescribed number of repetitions of the TFCI multiplied by a counter value indicating the repetition for which the bit is being selected; plus (c) a product of the first prescribed number of bits in the TFCI multiplied by the counter value indicating the repetition for which the bit is being selected; plus (d) a constant value, wherein each of the counters begins at '0', and wherein the constant value can be '0'.

* * * * *